(12) United States Patent
Mesenbrink

(10) Patent No.: US 11,072,271 B1
(45) Date of Patent: Jul. 27, 2021

(54) TRAILERS AND SYSTEMS FOR LIFTING AND CARRYING SPOOLS

(71) Applicant: LANE Trailer Mfg. Co., Boone, IA (US)

(72) Inventor: Lane Mesenbrink, Gilbert, IA (US)

( * ) Notice: Subject to any disclaimer, the term of this patent is extended or adjusted under 35 U.S.C. 154(b) by 0 days.

(21) Appl. No.: 16/842,714

(22) Filed: Apr. 7, 2020

(51) Int. Cl.
*B60P 1/44* (2006.01)
*B60P 3/035* (2006.01)

(52) U.S. Cl.
CPC ............ *B60P 1/4407* (2013.01); *B60P 3/035* (2013.01)

(58) Field of Classification Search
CPC ......... B25H 3/04; A47B 81/005; B60P 3/035; B60P 1/4407; B65H 49/325; B60R 11/00
See application file for complete search history.

(56) References Cited

U.S. PATENT DOCUMENTS

| | | | |
|---|---|---|---|
| 3,063,584 A * | 11/1962 | Fleischer et al. ...... | B65H 49/32 414/507 |
| 3,931,902 A * | 1/1976 | Love, Jr. .................. | B60P 3/035 414/458 |
| 5,647,489 A * | 7/1997 | Bellis, Jr. ............. | A47B 81/005 211/208 |
| 6,347,761 B1 | 2/2002 | Larson | |
| 6,554,221 B2 | 4/2003 | Hinds | |
| 6,932,224 B1 * | 8/2005 | Sandberg ............. | A47B 81/005 211/70.8 |
| 7,566,196 B2 * | 7/2009 | French ................... | B65H 49/38 414/482 |
| 7,591,497 B2 | 9/2009 | Johns | |
| 10,538,191 B2 | 1/2020 | Hooper et al. | |
| 2009/0196723 A1 | 8/2009 | Smith et al. | |
| 2011/0116902 A1 | 5/2011 | Smith et al. | |
| 2014/0056674 A1 | 2/2014 | Smith et al. | |
| 2015/0166297 A1 | 6/2015 | Smith et al. | |

\* cited by examiner

*Primary Examiner* — Gregory W Adams
(74) *Attorney, Agent, or Firm* — Olive Law Group, PLLC

(57) ABSTRACT

The presently disclosed subject matter relates to trailers and systems for lifting and carrying spools. According to an aspect, a trailer includes a frame comprising a first side portion and a second side portion. The trailer also includes a first rack and a second rack attached to the first side portion and the second side portion, respectively, each rack defining multiple notches. Further, the trailer includes a first lift structure and a second lift structure supported by the first side portion and the second side portion, respectively. Each of the first lift structure and the second lift structure defines multiple notches that are each associated with a respective one of the notches of the first rack and the second rack, respectively. Further, the trailer includes a lift mechanism configured to move the first lift structure and the second lift structure between respective first and second positions.

19 Claims, 16 Drawing Sheets

TRAILERS AND SYSTEMS FOR LIFTING AND CARRYING SPOOLS

TECHNICAL FIELD

The presently disclosed subject matter relates generally to trailers. Particularly, the presently disclosed subject matter relates to trailers and systems for lifting and carrying spools, such as telecommunications cable spools.

BACKGROUND

Trailers are often used to supplement the carrying capacity of trucks, vans, all-terrain vehicles (ATVs), cars, and other vehicles. Although these vehicles often have areas for carrying loads (e.g., a truck's cargo bay), there can be a need for use of a trailer to carry an additional load or a load that easily be carried by the vehicle alone. Vehicles can have a trailer hitch for attachment to a trailer such that the trailer can be pulled by the vehicle.

Various specialized trailers have been developed for carrying particular objects. For example, trailers for carrying large volumes of cargo are available for pull by semi-trailer trucks and other large trucks. There are also watercraft trailers that are specifically designed for hauling watercrafts. In addition, there are various utility-type trailers available for carrying utility equipment such as spools of telecommunications line or electrical line.

Spools of telecommunications and electrical line can be very heavy, up to 15,000 pounds in some instances. Therefore, there is a continuing need for improved trailers and related techniques for loading and unloading spools, reeling and unreeling spools, and generally managing the use of spools in a related work project.

BRIEF DESCRIPTION OF THE DRAWINGS

Figure 1:
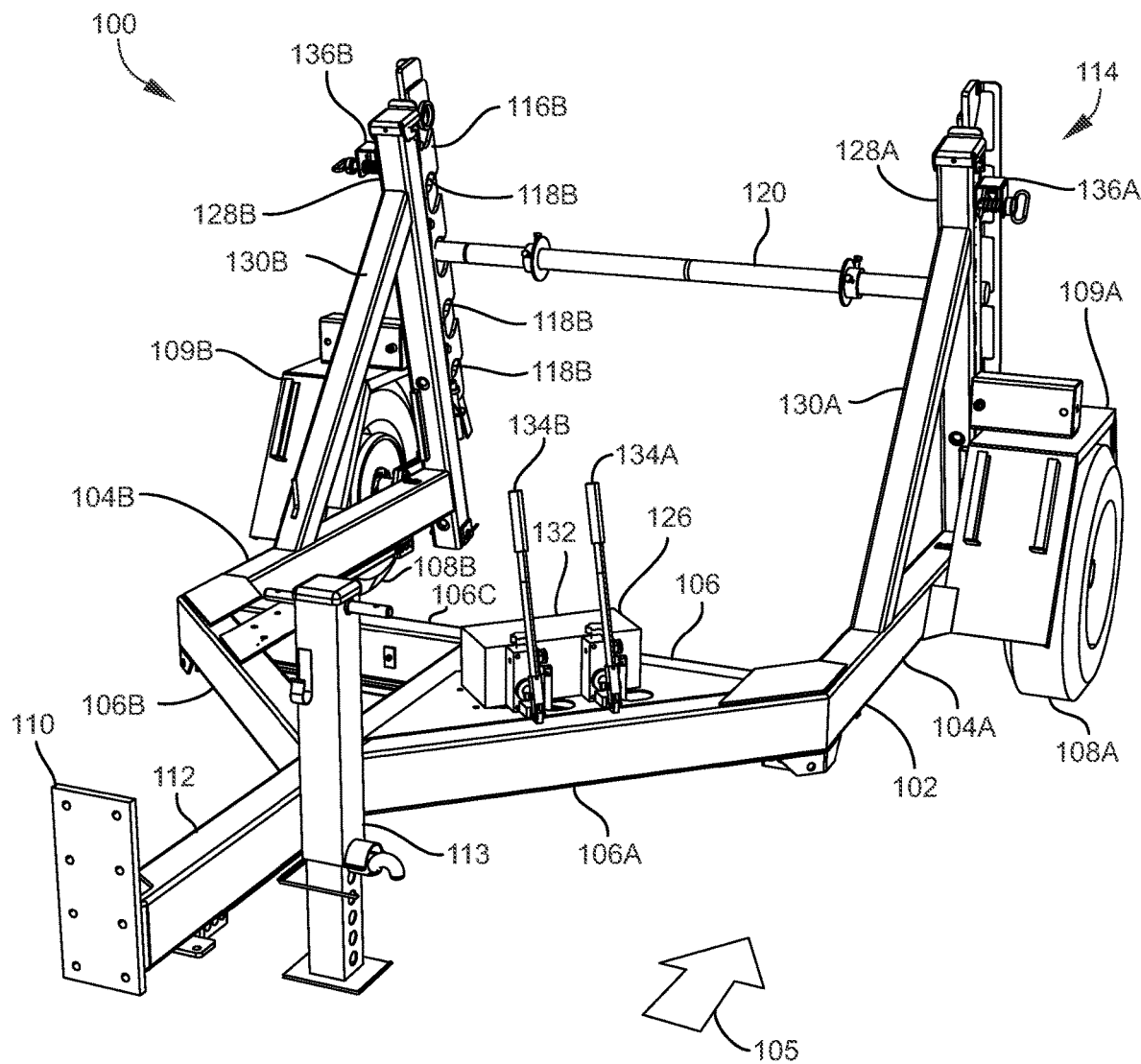
Figure 2:
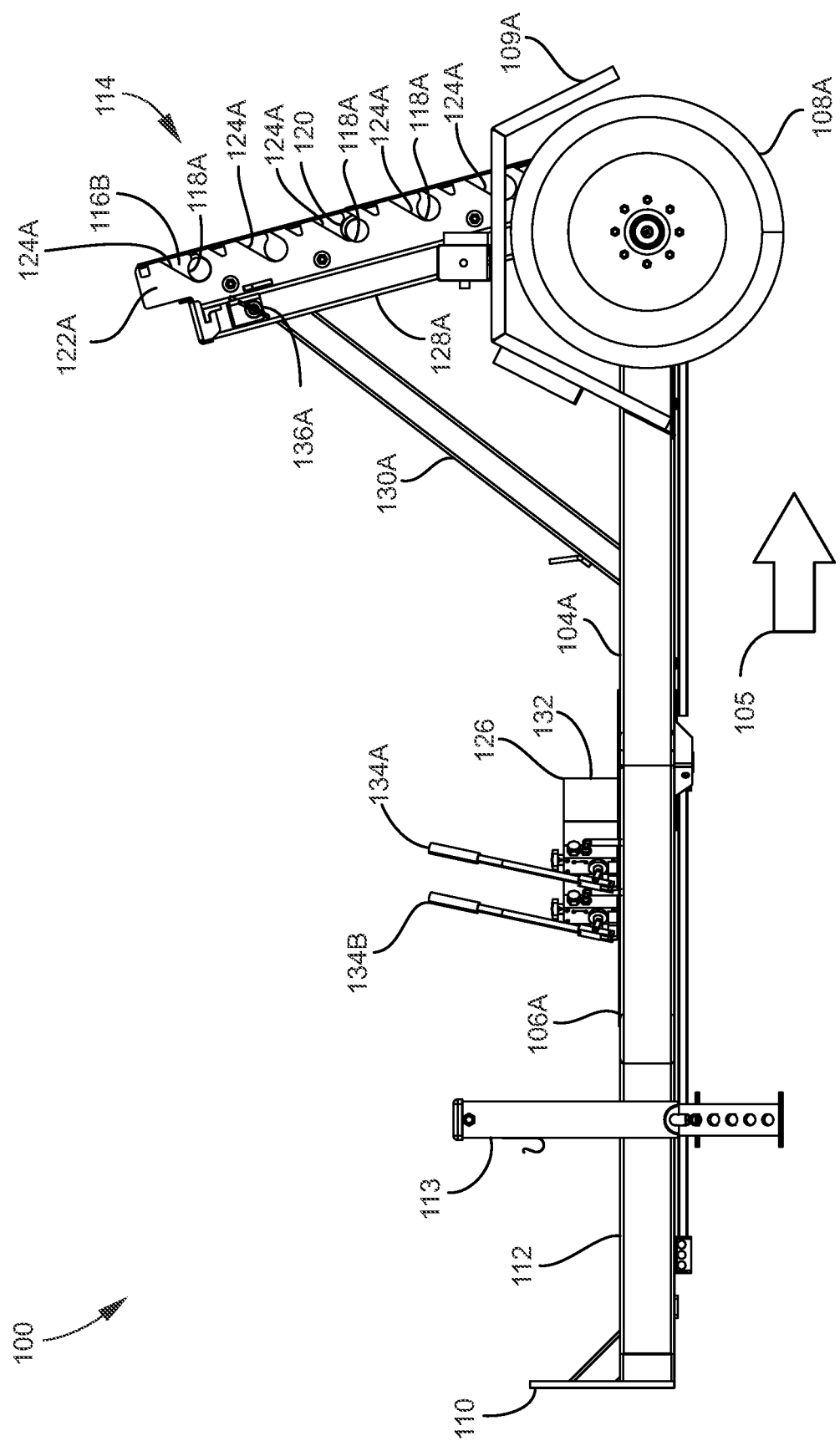
Figure 3:
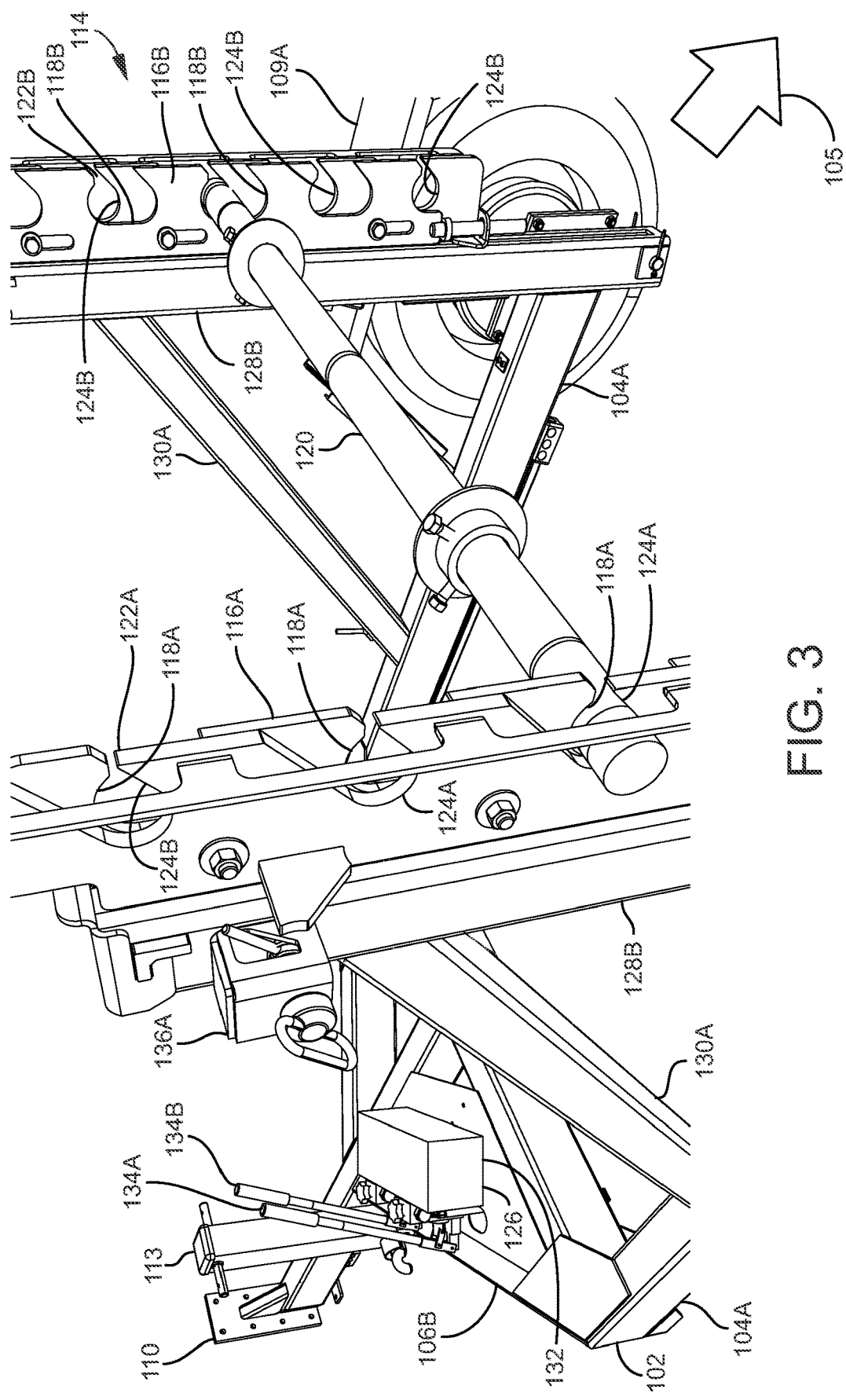
Figure 4:
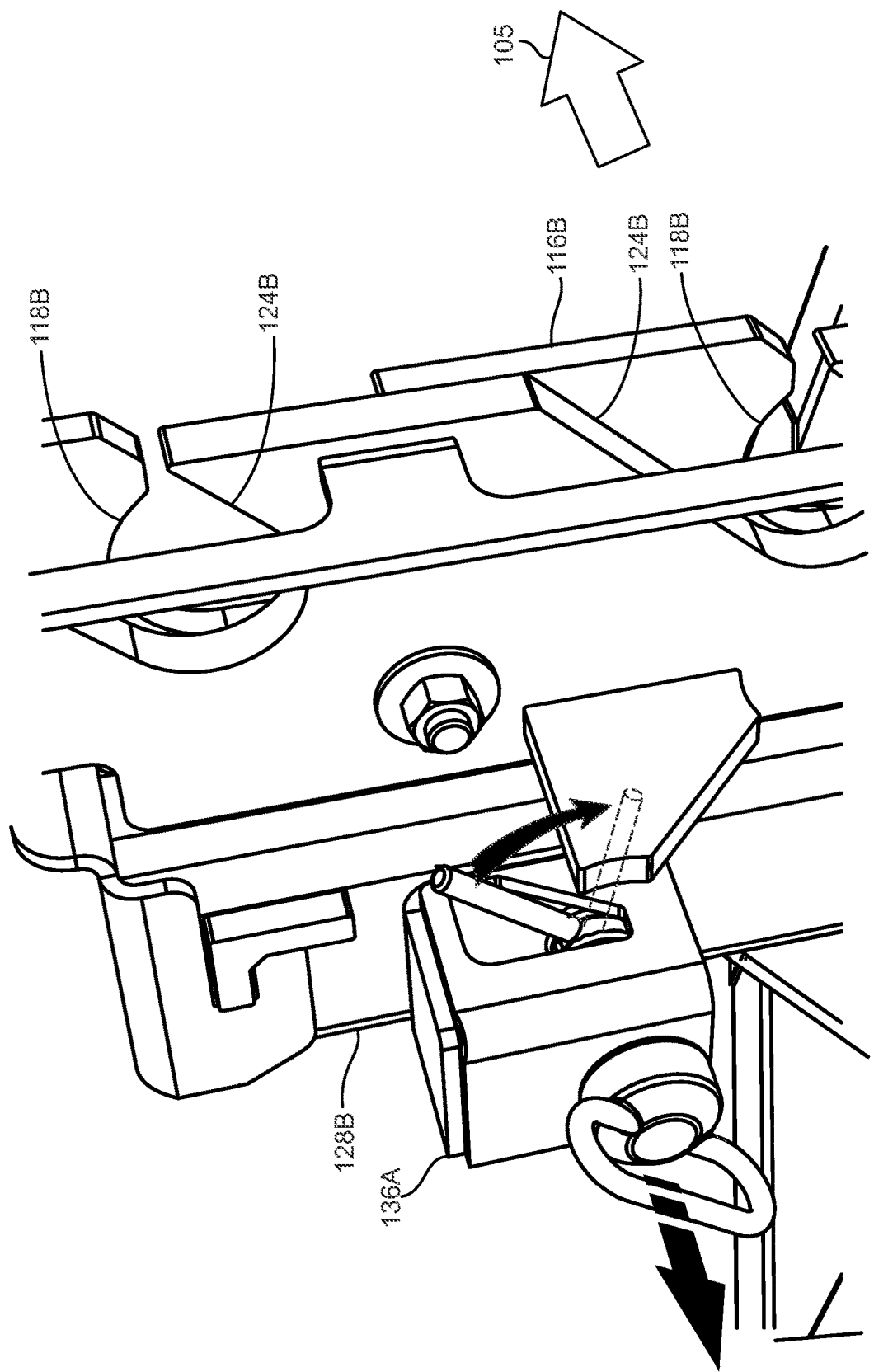
Figure 5:
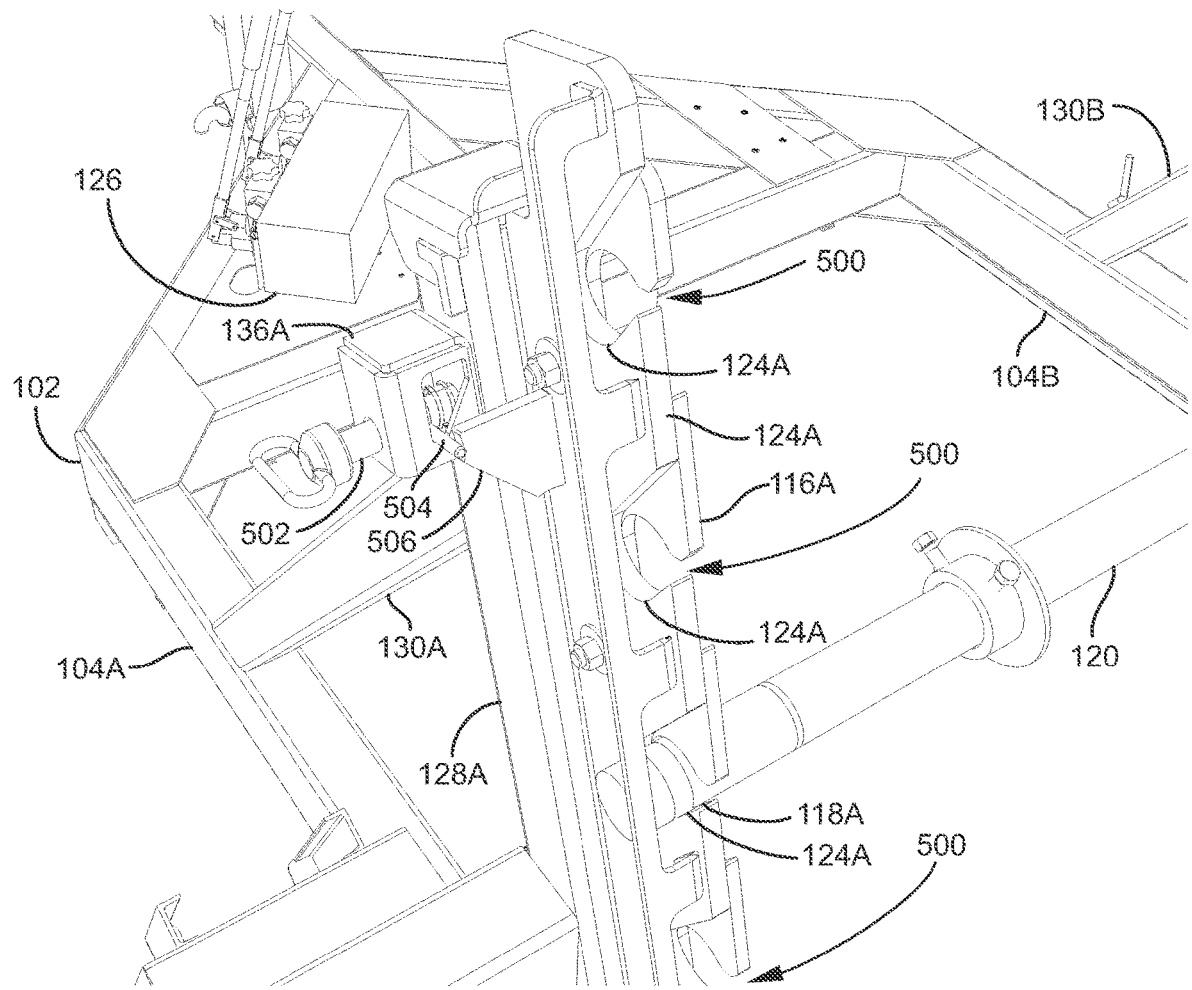
Figure 6:
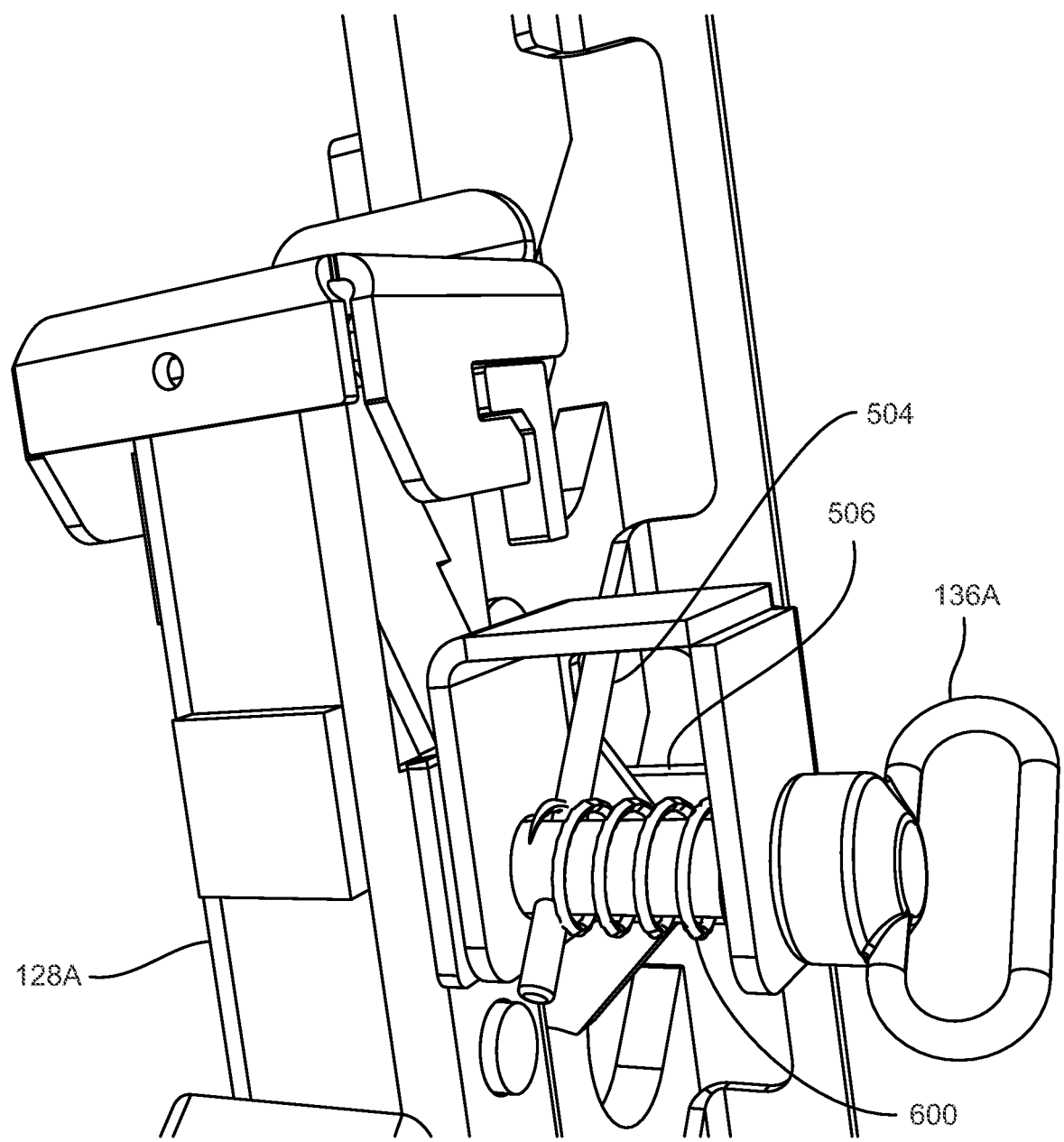
Figure 7:
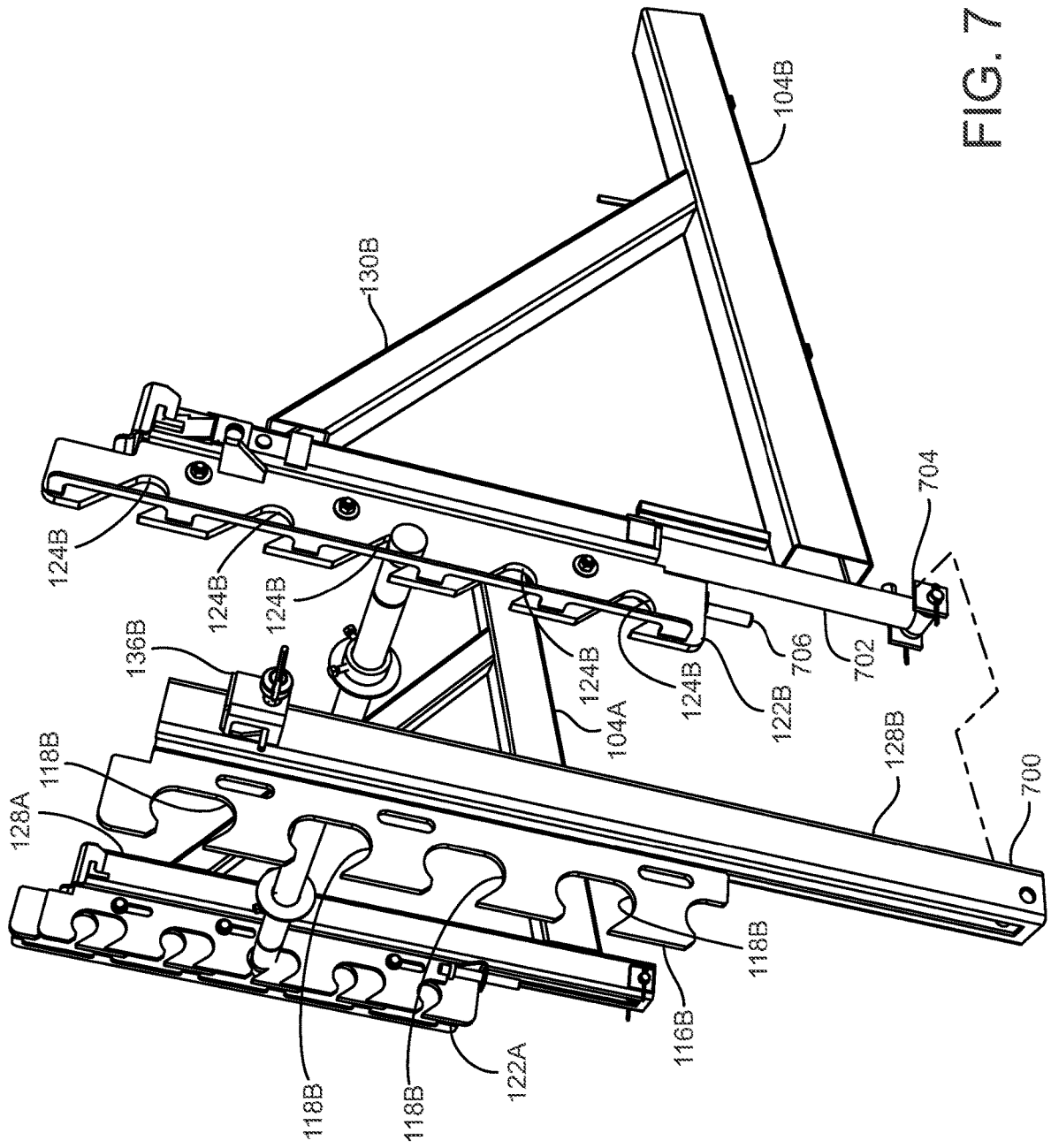
Figure 8:
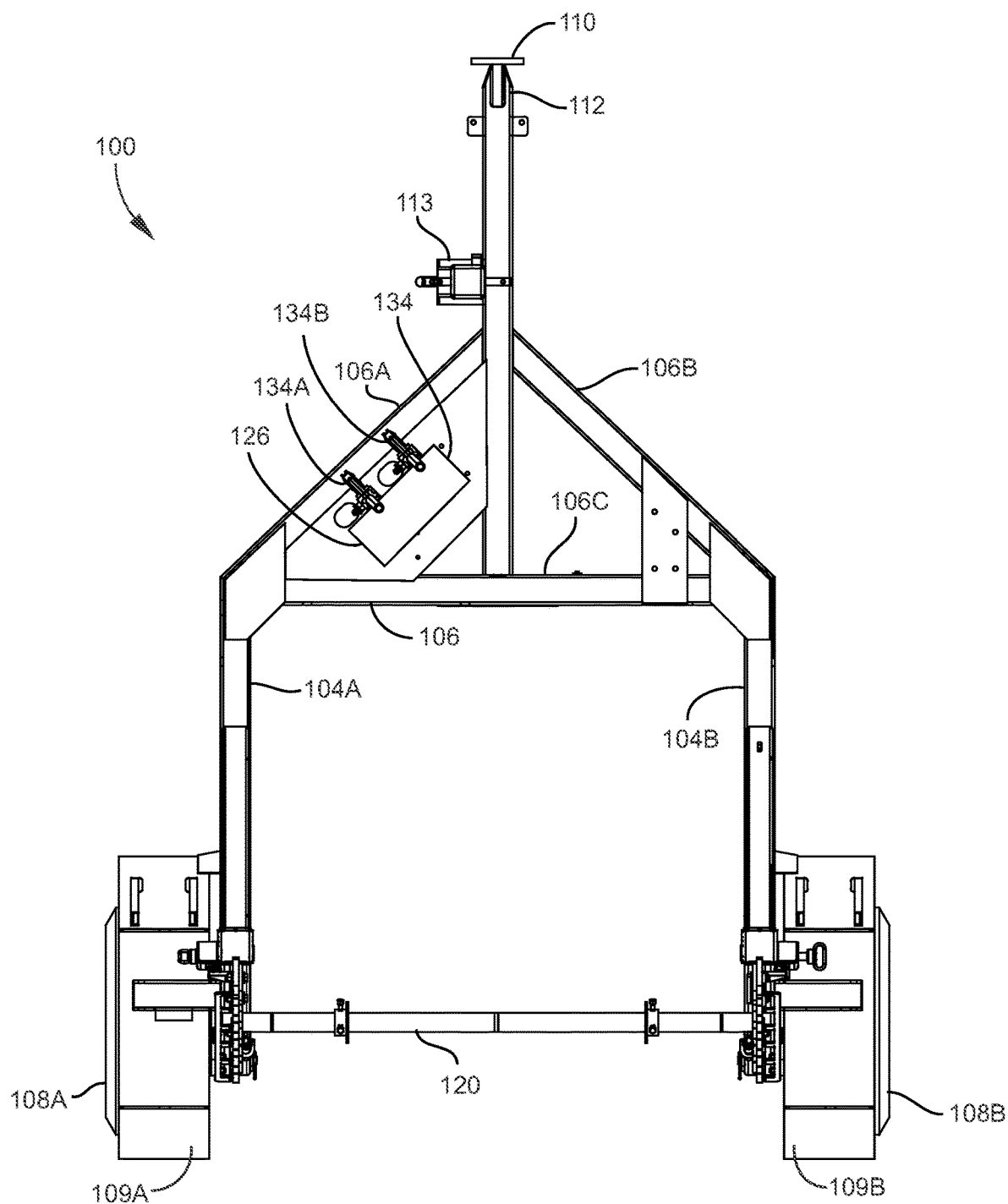
Figure 9:
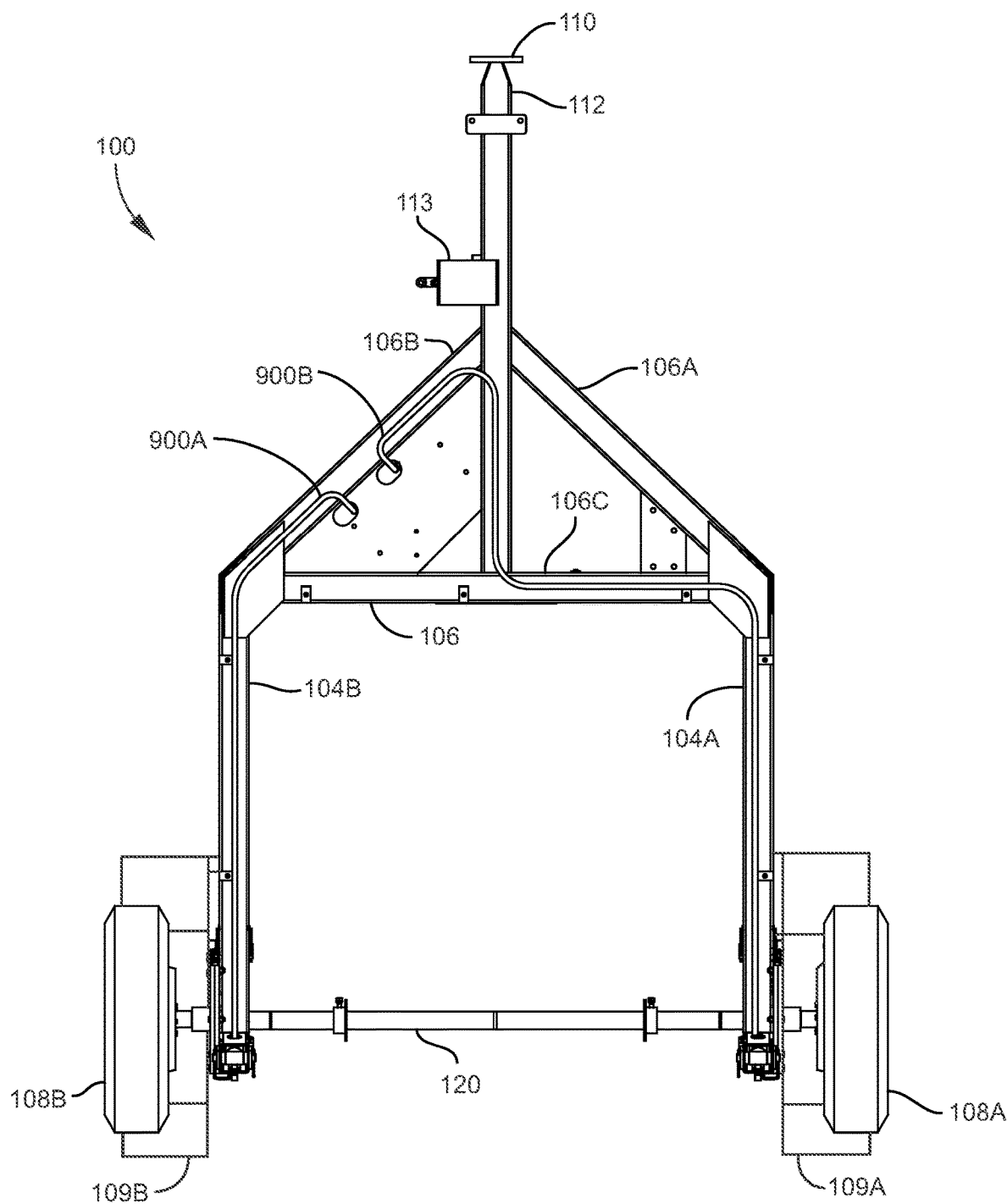
Figure 10:
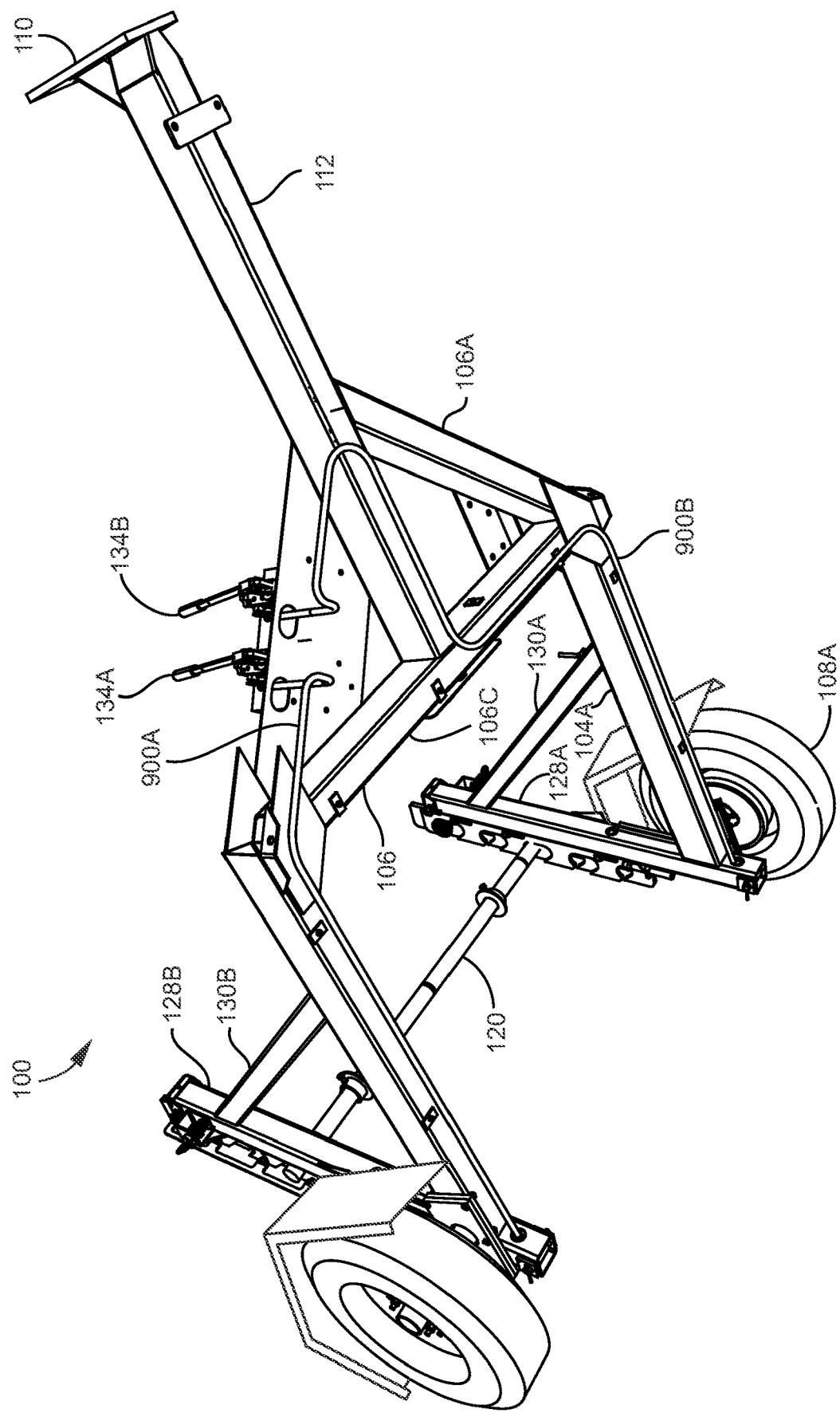
Figure 11:
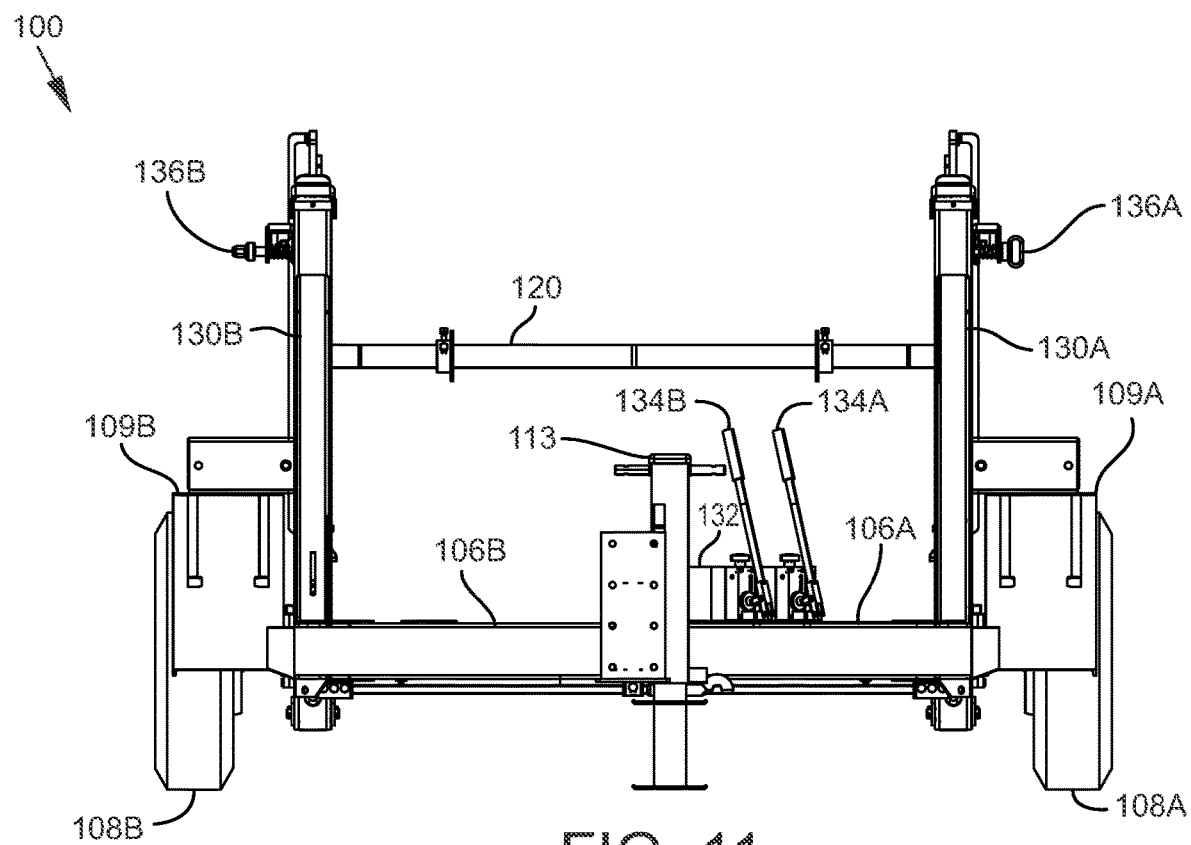
Figure 12:
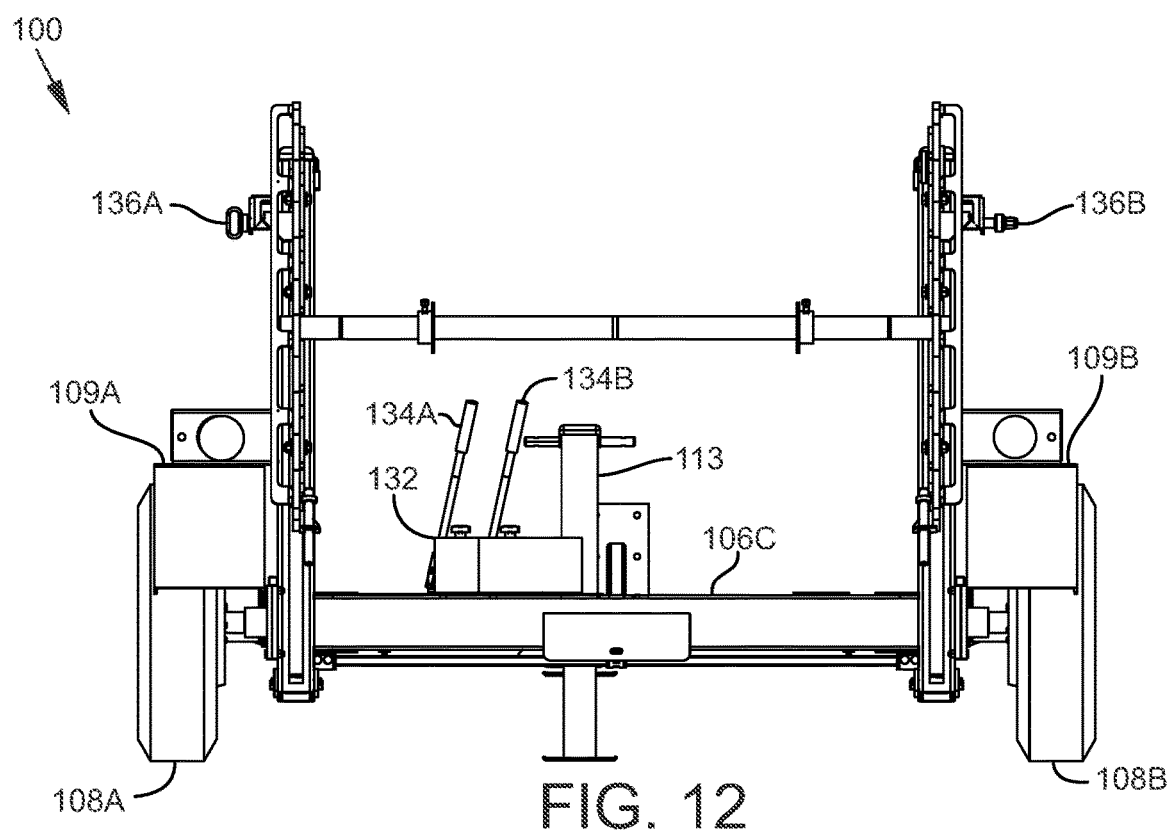
Figure 13:
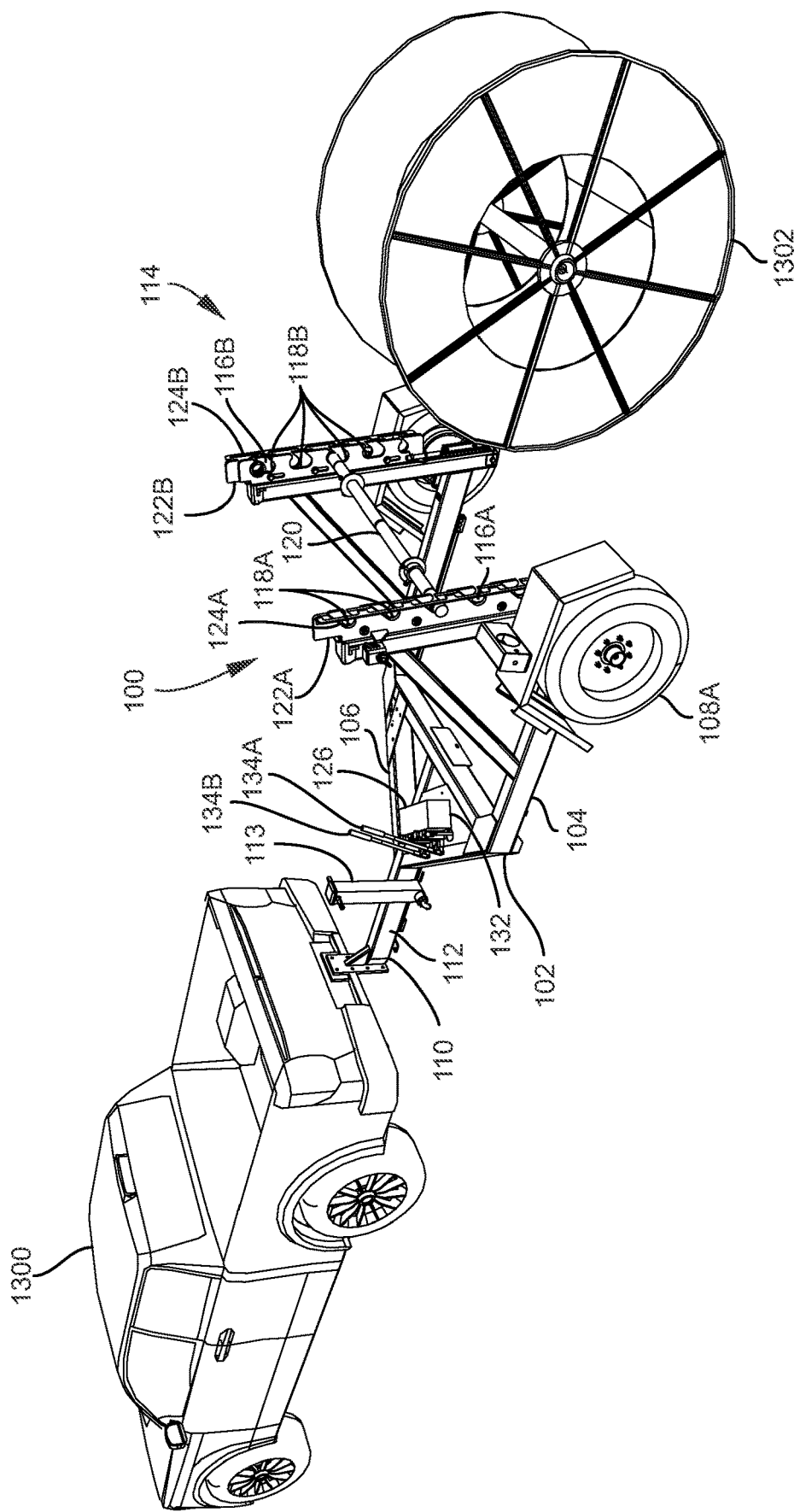
Figure 14:
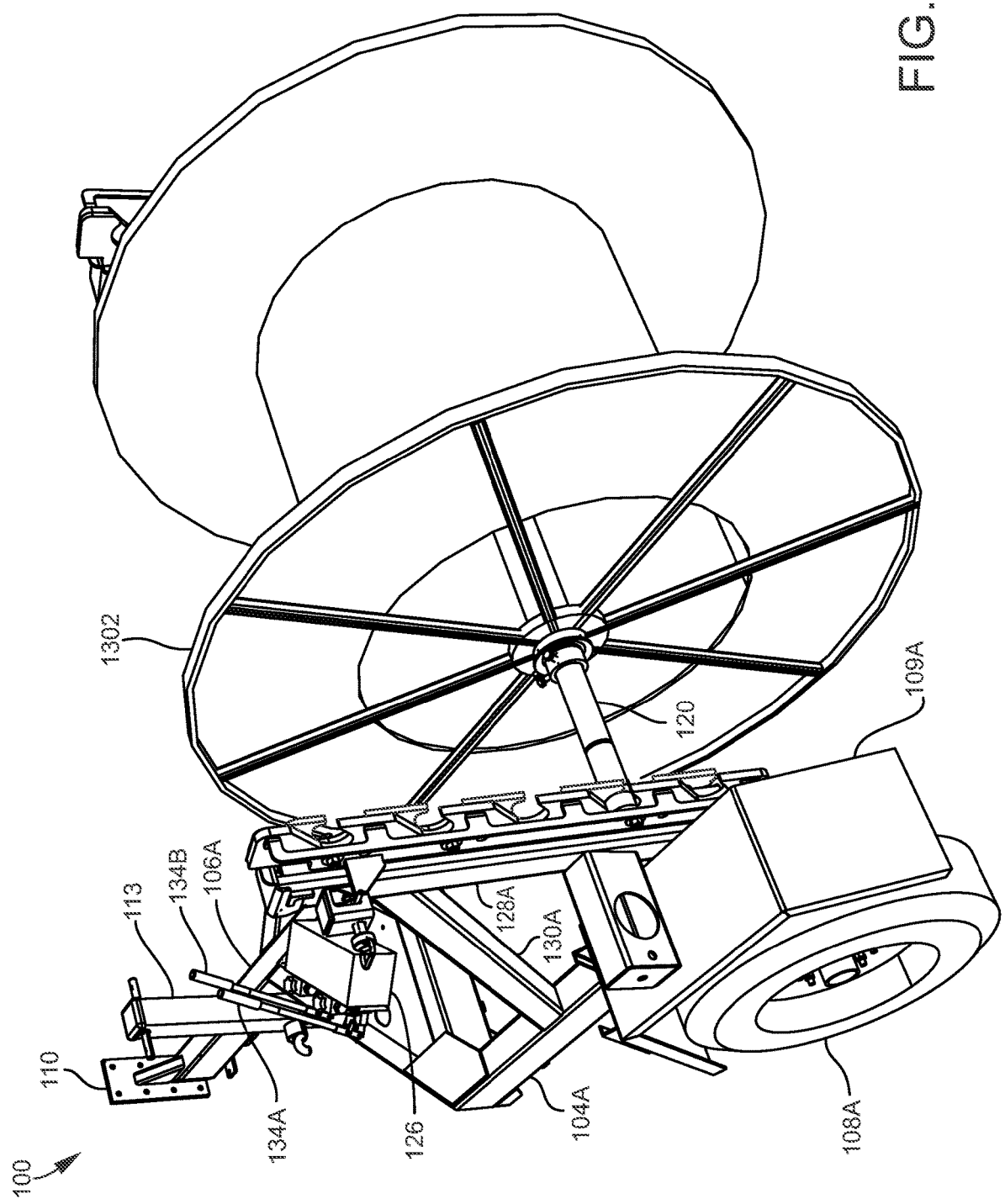
Figure 15:
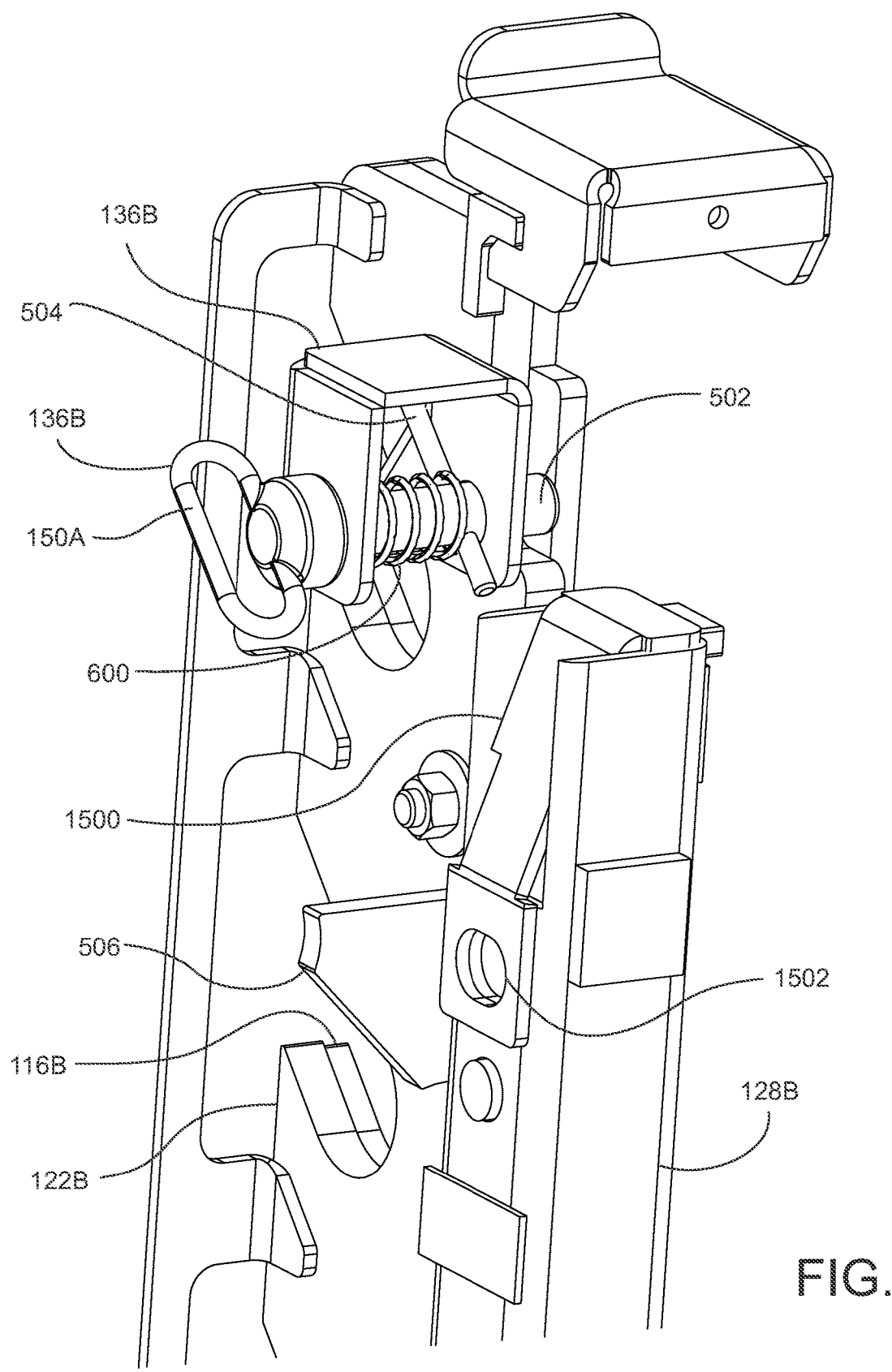
Figure 16A:
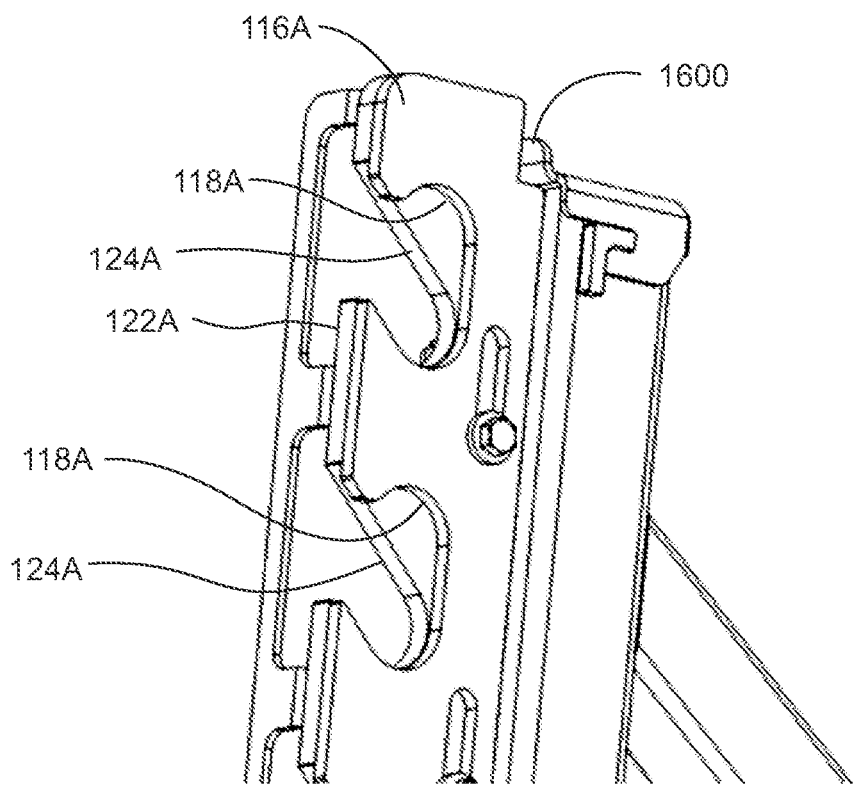
Figure 16B:
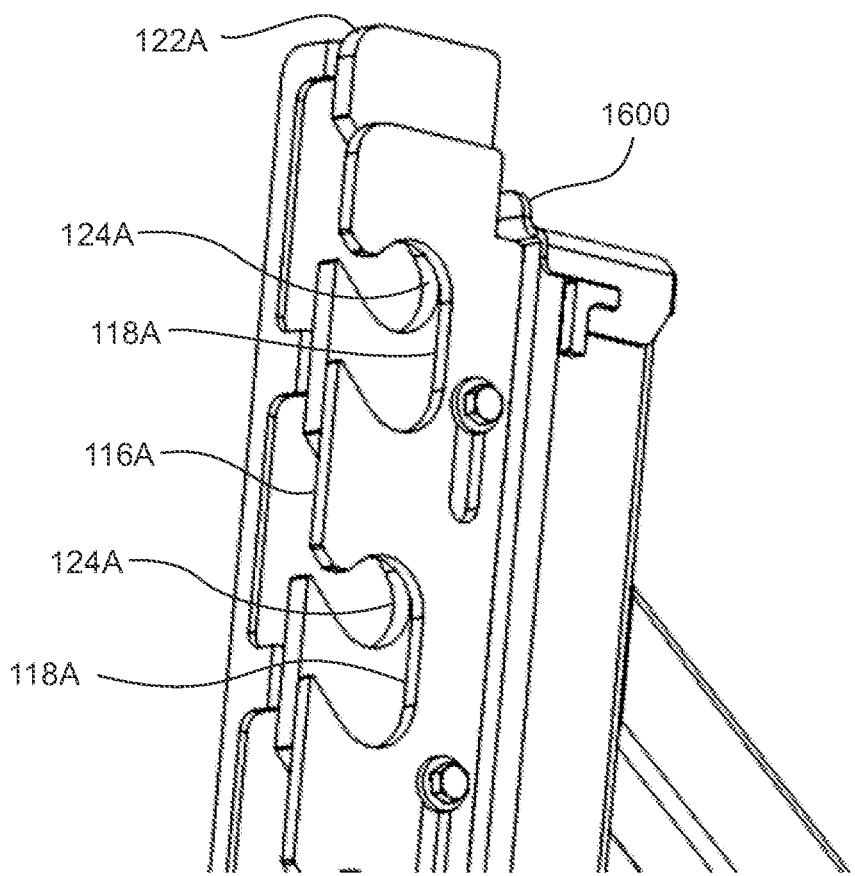
Figure 17A:
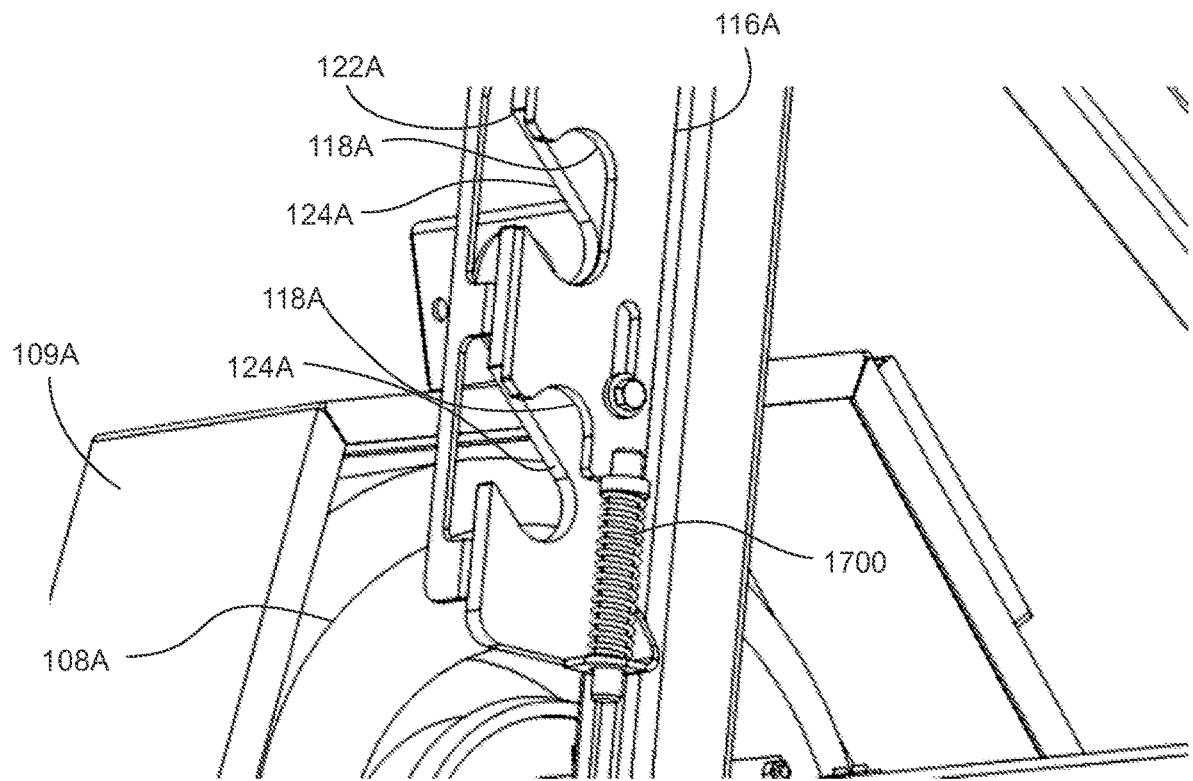
Figure 17B:
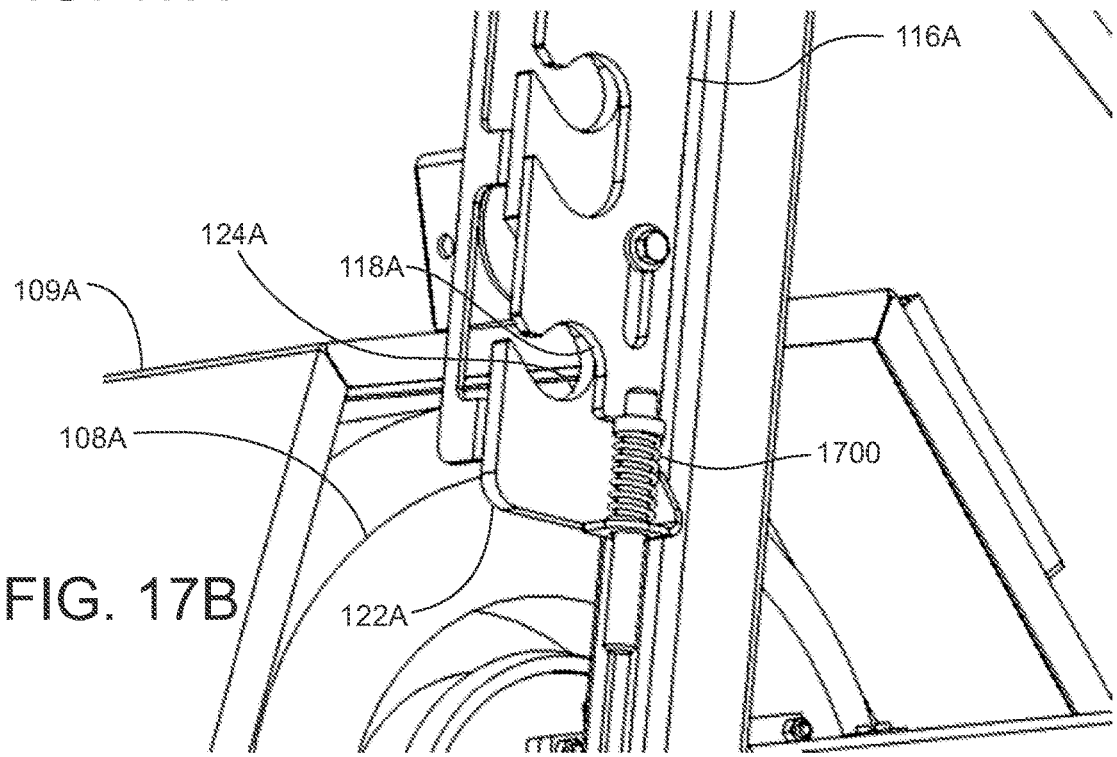

Having thus described the presently disclosed subject matter in general terms, reference will now be made to the accompanying Drawings, which are not necessarily drawn to scale, and wherein:

FIG. 1 is a perspective view of a trailer for lifting and carrying spools in accordance with embodiments of the present disclosure;

FIG. 2 is a side view of the trailer shown in FIG. 2;

FIG. 3 is a zoomed-in perspective view of a mechanism of the trailer shown in FIGS. 1 and 2;

FIG. 4 is a further zoomed-in perspective view of a portion of the mechanism shown in FIG. 3;

FIG. 5 is a view showing the notches of the mechanism in an open position such that the bar of the spool may be received or released;

FIG. 6 is another perspective view of the locking mechanism including the spring for effecting its spring-loaded functionality;

FIG. 7 is a perspective view of the mechanism and side portions of the trailer shown in FIGS. 1-6 with one rack along with its attached vertical member and locking mechanism removed for ease of view;

FIGS. 8 and 9 are a top view and a bottom view, respectively, of the trailer shown in FIGS. 1-7;

FIGS. 10-12 are a bottom perspective view, a front view, and a rear view, respectively, of the trailer shown in FIGS. 1-11;

FIG. 13 is a rear perspective view of a trailer coupled to a vehicle during an operation to load a spool in accordance with embodiments of the present disclosure;

FIG. 14 is a rear perspective view of the trailer having engaged and lifted the spool for carry;

FIG. 15 is a zoomed-in perspective view showing operation of the locking mechanism 136B in further detail;

FIG. 16A is a zoomed-in perspective view of a position of the lift structure for receipt of a spool bar together with a rack;

FIG. 16B is a zoomed-in perspective view of a position of the lift structure such that it cooperates with the rack to lock the spool bar in place for carry;

FIG. 17A is another zoomed-in perspective view of a position of the lift structure for receipt of a spool bar together with rack; and FIG. 17B is a zoomed-in perspective view of a position of the lift structure such that it cooperates with the rack to lock the spool bar in place for carry.

SUMMARY

The presently disclosed subject matter relates to trailers and systems for lifting and carrying spools. According to an aspect, a trailer includes a frame comprising a first side portion and a second side portion. The trailer also includes a first rack and a second rack attached to the first side portion and the second side portion, respectively, each rack defining multiple notches. Further, the trailer includes a first lift structure and a second lift structure supported by the first side portion and the second side portion, respectively. Each of the first lift structure and the second lift structure defines multiple notches that are each associated with a respective one of the notches of the first rack and the second rack, respectively. Further, the trailer includes a lift mechanism configured to move the first lift structure and the second lift structure between respective first and second positions. In the first position, each respective notch the first rack and the first lift structure define an opening for receiving a first portion of a bar of a spool, and each respective notch the second rack and the second lift structure define an opening in an open position for receiving a second portion of the bar of the spool. In the second position, each respective notch of the first rack and the first lift structure define a closed position for holding the first portion of the bar of the spool, and each respective notch of the second rack and the second lift structure define a closed position for holding the second portion of the bar of the spool.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including,"

"comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

FIGS. 1-12 illustrate different views of a trailer 100 for lifting and carrying spools in accordance with embodiments of the present disclosure. Particularly, FIGS. 1 and 2 illustrate a perspective view and a side view, respectively, of the trailer 100. Referring to FIGS. 1 and 2, the trailer 100 includes a frame 102 having a left side portion 104A and a right side portion 104B. A connecting structure 106 attaches the side portions 104A and 104B together. The side portions 104A and 104B extend rearward (the direction generally indicated by arrow 105) from the connecting structure 106. The trailer 100 includes a set of wheels 108A and 108B that carry the frame 102. Particularly, the wheels 108A and 108B are operably attached to the side portions 104A and 104B, respectively, for mobility of the trailer 100. Wheels 108A and 108B are covered by fenders 109A and 109B, respectively, which are attached to side portions 104A and 104B, respectively.

The connecting structure 106 may be an assembly of rigid components 106A-106C that are attached together as shown for providing stability to the trailer 100. The connecting structure 106 and other components of the trailer 100 disclosed herein may be made of metal or any other suitably rigid material. Further, the components may be welded together, bolted together, or otherwise suitably attached to one another.

The trailer 100 includes a coupler 110 configured to operably attach to a tow assembly of a vehicle for pulling or backing the trailer 100. Particularly, the coupler 110 may be suitably attached to the tow assembly by bolting. Alternatively, for example, the coupler 110 may be a hitch configured to attach to a tow ball that allows swiveling and articulation of the trailer 100. In another example, the coupler 110 may be configured to attach to a tow pin of a vehicle's tow assembly. The coupler 110 may engage the vehicle for pulling by connection of the coupler 110 to the vehicle. When engaged, the trailer 100 may be pulled forward or pushed backward by the vehicle.

The trailer 100 may include various safety features not specifically shown in the figures. For example, the trailer 100 may include safety chains for attachment to the vehicle. Also, the trailer 100 may include electrical wires for powering turn signal and braking lights of the trailer 100.

The trailer 100 includes a tongue portion 112 that attaches the coupler 110 to the connecting structure 106. A trailer jack 113 is mounted to the tongue portion 112 for holding the trailer in a level position or substantially level position when the trailer coupler 110 is disengaged from a vehicle. The jack 113 can be operated to raise or lower the front portion of the trailer 100.

In accordance with embodiments, the trailer 100 includes a mechanism 114 supported and carried by the frame 102 for lifting and carrying a spool, such as telecommunications cable spool. With reference now to FIG. 3, which illustrates a zoomed-in perspective view of the mechanism 114, the mechanism 114 includes racks 116A and 116B that are fixedly attached to the side portions 104A and 104B, respectively. FIG. 4 illustrates a further zoomed-in perspective view of a portion of the mechanism 114. The racks 116A and 116B define multiple notches 118A and 118B, respectively, that are each open in a rearward direction. Each notch 118A of the left side portion 104A has a corresponding notch 118B of the right side portion 104B to form a pair of notches that can operate together to receive a bar 120 of a spool (not shown) in order to support and carry the spool. Each pair of corresponding notches is generally aligned in a horizontal direction such that the pair can receive the bar 120 of the spool when the spool is positioned upright as will be described herein in more detail. The notches 118A and 118B open and face rearward such that the trailer 100 may be backed towards the spool or the spool may be rolled towards the trailer 100 such that side portions of the bar 120 may be positioned within respective notches 118A and 118B. It is noted that the notched pairs are positioned at different heights along the length of the racks 116A and 116B to accommodate the heights of bars of different sizes.

Racks 116A and 116B can cooperatively operate with lift structures 122A and 122B for lifting and carrying a spool on the bar 120. Particularly, each rack notch 118A and 118B has a corresponding notch 124A and 124B, respectively, of the lift structures 122A and 122B, respectively. The lift structures 122A and 122B define the notches 118A and 118B, respectively, and the notches 118A and 118B are each open in a rearward direction. The lift structures 122A and 122B may be moved upward and downward such that they move with respect to the racks 118A and 118B, respectively. Particularly, the trailer 100 includes a lift mechanism 126 configured to move the lift structures 122A and 122B between a raised position and a lowered position for either holding and securing the bar 120 for transport of the spool, or for receiving or releasing the bar 120 as will be described in more detail herein.

Referring specifically to FIGS. 1-3, the lift structures 122A and 122B are shown in a raised position such that the bar 120 is held and secured to the mechanism 114. As shown, portions of the bar 120 is grasped by the closure together in a closed position of the respective notches of the racks 116A and 116B and the lift structures 122A and 122B. FIG. 4 provides a close-up view of the closed position of the notches together for holding the bar.

FIG. 5 illustrates the notches of the mechanism 114 in an open position such that the bar 120 of the spool may be received or released. Now referring to FIG. 5, the lift structures 122A and 122B are in the lowered position. Respective notches 118A, 124A and 118B, 124B in this open position form openings 500 such that the bar 120 can be removed or the bar 120 can be inserted into the openings 500.

With reference to FIGS. 1-5, the racks 116A and 116B and the lift structures 122A and 122B are supported by and attached to vertical members 128A and 128B, respectively. The vertical members 128A and 128B are attached to support members 130A and 130B, respectively, for holding the vertical members 128A and 128B, respectively, upright.

The racks 116A and 116B and the vertical members 128A and 128B are attached to side portions 104A and 104B, respectively.

In embodiments, the mechanism 126 is a hydraulic system configured to raise and lower the lift structures 122A and 122B. The hydraulic system is suitably connected to and operably with the lift structures 122A and 122B for raising and lowering the lift structures between raised position and the lowered position. The mechanism includes a hydraulic control box 132 with levers 134A and 134B for use by an operator to raise and lower lift structures 122A and 122B, respectively.

Locking mechanisms 136A and 136B are operably integrated with and attached to lift structures 122A and 122B, respectively, for locking the lift structures 122A and 122B in the raised position. In the raised position, the bar 120 may be held in place and the spool raised for transport via the trailer 100 and a vehicle attached thereto. Referring to FIG. 5, the locking mechanism 136A is shown in detail. Particularly, the locking mechanism 136A includes a spring-loaded locking pin 502 that may be pulled and rotated such that an arm 504 attached to the pin 502 may hold onto a component 506 (as shown in FIG. 5) to keep the pin 502 from inserting into an aperture (not shown) of the rack 116A. When held in this position, the lift structure 122A may be raised or lowered by the hydraulic system. Conversely, when the pin 502 is released and inserted into an aperture of the rack 116A, the lift structure 122A may be prevented from being raised or lowered by the hydraulic system. The locking mechanism 136B may operate similarly with the rack 116B and the lift structure 122B. FIG. 6 illustrates another perspective view of the locking mechanism 136A including the spring 600 for effecting its spring-loaded functionality.

FIG. 7 illustrates a perspective view of the mechanism 114 and side portions 104A and 104B of the trailer 100 shown in FIGS. 1-6 with one rack 116B along with its attached vertical member 128B and locking mechanism 136B removed for ease of view. Referring to FIG. 7, a lower portion 700 of the vertical member 128B may attach to a hydraulic component 702 at end 704. The hydraulic component 702 may operate to move the lift structure 122B upward and downward. A rod 706 may interface with the vertical member 128B such that the lift structure 122B can slide about the rod 706 during the upward and downward movement. The lift structures 122A and 122B can each contact a cap forcing it to close. The rods 706 can each capture a spring (not shown) that is used to force open its respective locking mechanism 122A, 122B when the locking mechanism lowers. It is also noted that rods 706 can each be securely attached to its respective locking mechanism 122A, 122B, such as by welding.

FIGS. 8 and 9 illustrate a top view and a bottom view, respectively, of the trailer 100 shown in FIGS. 1-7. Referring to FIGS. 8 and 9, the lift mechanism 126 is shown. The lift mechanism include hydraulic lines 900A and 900B that are operably connected to levers 134A and 134B, respectively, for raising and lowering the lift structures 122A and 122B, respectively.

FIGS. 10-12 illustrate a bottom perspective view, a front view, and a rear view, respectively, of the trailer 100 shown in FIGS. 1-11.

FIG. 13 illustrates a rear perspective view of a trailer 100 coupled to a vehicle 1300 during an operation to load a spool 1302 in accordance with embodiments of the present disclosure. Referring to FIG. 13, the vehicle 1300 is a truck that is coupled to the trailer. The truck 1300 is backing the trailer 100 towards the spool 1302 such the trailer can engage the spool 1302 with the mechanism 114. Once engaged together, the mechanism 114 can lift and hold in place the spool by the spool's bar such that the truck 1300 may subsequently transport the spool 1302. FIG. 14 illustrates a rear perspective view of the trailer 100 having engaged and lifted the spool 1302 for carry.

FIG. 15 illustrates a zoomed-in perspective view showing operation of the locking mechanism 136B in further detail. Referring to FIG. 15, this figure reveals a ramp component 1500 attached to the vertical member 128 for pushing the pin 502 outward the lift structure 122B is moved upward. When the end of the pin 502 contacts the ramp 1500, it is pushed outward and thereby compresses the spring 600. At a particular height (referred to as the "maximum height position"), the pin 502 engages into an opening or hole 1502 defined in the lift structure 122B due to force exerted by the spring 600 onto the pin 502 in the direction of the opening 1502. Thereby, the pin 502 can automatically engage and secure the rack 116B at the maximum height position to prevent the rack 116B from moving downward for purpose of safety and convenience.

With continuing reference to FIG. 15, in order to lower the rack 116B, the pin 502 may be pulled by an attached handle 1504 to release the pin 502 from engagement with the opening 1502. Further, the handle 1504 may be turned or twisted such that the arm 504 holds onto the component 506 as depicted in FIG. 5. Then the hydraulic pressure can be released causing the rack 116B to go down. This component 506 may also move down with the rack 116B and the pin 502 will not reengage into the hole 1502 because it has moved below the pin 502. In this way, it is ready to automatically ramp in and engage when the rack 116B is moved to the maximum height position again.

FIG. 16A illustrates a zoomed-in perspective view of a position of the lift structure 122A for receipt of a spool bar together with rack 116A. In operation as discussed herein, the lift structure 122A can be hydraulically raised until it reaches a maximum height position as shown in FIG. 16B, which illustrates a zoomed-in perspective view of a position of the lift structure 122A such that it cooperates with the rack 116A to lock the spool bar in place for carry. At the maximum height position, a portion of the lift structure 122A contacts a cap 1600 where it stops. This causes the notches 116A and 118A to lock about the spool bar.

FIG. 17A illustrates another zoomed-in perspective view of a position of the lift structure 122A for receipt of a spool bar together with rack 116A. In operation as discussed herein, the lift structure 122A can be hydraulically raised until it reaches a maximum height position as shown in FIG. 17B, which illustrates a zoomed-in perspective view of a position of the lift structure 122A such that it cooperates with the rack 116A to lock the spool bar in place for carry. Now referring to both FIGS. 17A and 17B, a compression spring 1700 is shown that operates to keep the notches 116A and 118A in position with respect to each other for receipt of the spool bar until the lift structure 122A is hydraulically raised to the maximum height position (i.e., the position where the lift structure 122A contacts a cap 1600 shown in FIGS. 16A and 16B). As the lift structure 122A continues to be raised to the maximum height position, the spring 1700 compresses to allow the rack 116A and lift structure 122A to lock the spool bar in place for carry While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A trailer comprising:
   a frame comprising a first side portion and a second side portion;
   a first rack and a second rack attached to the first side portion and the second side portion, respectively, each rack defining a plurality of notches;
   a first lift structure and a second lift structure supported by the first side portion and the second side portion, respectively, each of the first lift structure and the second lift structure defining a plurality of notches that are each associated with a respective one of the notches of the first rack and the second rack, respectively;
   a lift mechanism configured to move the first lift structure and the second lift structure between respective first and second positions,
   wherein in the first position, each respective notch of the first rack and the first lift structure define an opening for receiving a first portion of a bar of a spool, and each respective notch the second rack and the second lift structure define an opening in an open position for receiving a second portion of the bar of the spool, and
   wherein in the second position, each respective notch of the first rack and the first lift structure define a closed position for holding the first portion of the bar of the spool, and each respective notch of the second rack and the second lift structure define a closed position for holding the second portion of the bar of the spool; and
   locking mechanisms comprising a locking pin integrated with the lift structures, wherein the locking pin is configured to insert into a defined aperture to lock the lift structures in the closed position in response to the lift structures being moved into the second position, and wherein the locking pin is moveable from insertion into the defined aperture to another position such that the lift structures are unlocked from the open position for releasing hold of the bar,
   wherein the locking mechanisms further comprising a biasing member that urges the locking pin substantially in a direction for insertion into the defined aperture, and
   wherein the pin comprises an arm, and the trailer further comprising a component configured to hold the arm of the pin to resist movement in the direction for insertion into the defined aperture when the pin is oriented in a predetermined position.

2. The trailer of claim 1, wherein the frame further comprises a connecting structure that attaches the first side portion and the second side portion together.

3. The trailer of claim 2, wherein the connecting structure comprises a plurality of rigid components attached together.

4. The trailer of claim 1, wherein the first side portion and the second side portion extend horizontally.

5. The trailer of claim 4, wherein the first side portion and the second side portion are substantially parallel.

6. The trailer of claim 1, further comprising a first wheel and a second wheel operably connected to the first side portion and the second side portion, respectively.

7. The trailer of claim 1, wherein the first rack and the second rack extend in a substantially vertical direction from attachment to the first side portion and the second side portion, respectively.

8. The trailer of claim 7, wherein the first rack and the second rack extend at a forward angle.

9. The trailer of claim 7, wherein the notches are aligned along their respective racks in the vertical direction.

10. The trailer of claim 1, wherein the notches of the first rack and the second rack open in a rearward direction.

11. The trailer of claim 1, further comprising:
    a first vertical member and a second vertical member attached to the first rack and the second rack, respectively, and to the first side portion and the second side portion, respectively; and
    a first support member and a second support member attached to the first vertical member and the second vertical member, respectively, and to the first side portion and the second side portion, respectively, for supporting the first vertical member and the second vertical member, respectively.

12. The trailer of claim 1, wherein the first lift structure and the second lift structure extend in a substantially vertical direction.

13. The trailer of claim 12, wherein the first lift structure and the second lift structure extend at a forward angle.

14. The trailer of claim 12, wherein the notches are aligned along their respective lift structures in the vertical direction.

15. The trailer of claim 1, wherein the notches of the first vertical structure and the second vertical structure open in a rearward direction.

16. The trailer of claim 1, wherein the notches of the lift structures are each substantially U-shape.

17. The trailer of claim 1, wherein the notches of the rack are each defined by an opening that widens to a holding area of the respective portions of the bar of the spool.

18. The trailer of claim 1, wherein the lift mechanism comprises a hydraulic system configured to raise and lower the first and second lift structures.

19. A method for lifting and carrying spools, the method comprising:
    providing a trailer comprising:
    a frame comprising a first side portion and a second side portion;
    a first rack and a second rack attached to the first side portion and the second side portion, respectively, each rack defining a plurality of notches;
    a first lift structure and a second lift structure supported by the first side portion and the second side portion, respectively, each of the first lift structure and the second lift structure defining a plurality of notches that are each associated with a respective one of the notches of the first rack and the second rack, respectively; and
    wherein the first lift structure and the second lift structure are configured to be moved between respective first and second positions,
    wherein in the first position, each respective notch the first rack and the first lift structure define an opening for receiving a first portion of a bar of a spool, and each respective notch the second rack and the second lift structure define an opening in an open position for receiving a second portion of the bar of the spool, and
    wherein in the second position, each respective notch of the first rack and the first lift structure define a closed position for holding the first portion of the bar of the spool, and each respective notch of the second rack and the second lift structure define a closed position for holding the second portion of the bar of the spool;

locking mechanisms comprising a locking pin integrated with the lift structures, wherein the locking pin is configured to insert into a defined aperture to lock the lift structures in the closed position in response to the lift structures being moved into the second position, and wherein the locking pin is moveable from insertion into the defined aperture to another position such that the lift structures are unlocked from the open position for releasing hold of the bar, wherein the locking mechanisms further comprising a biasing member that urges the locking pin substantially in a direction for insertion into the defined aperture, and wherein the pin comprises an arm and the trailer further comprising a component configured to hold the arm of the pin to resist movement in the direction for insertion into the defined aperture when the pin is oriented in a predetermined position; and moving the first lift structure and the second lift structure to one of the first position and the second position.

\* \* \* \* \*